(No Model.)

J. F. BYERS.
FRICTION CLUTCH.

No. 499,208. Patented June 13, 1893.

Witnesses
Lizzie A. Woodruff
N. B. Dickinson

Inventor
John F. Byers
by Bradford Howland
Attorney

UNITED STATES PATENT OFFICE.

JOHN F. BYERS, OF RAVENNA, OHIO, ASSIGNOR TO THE JOHN F. BYERS MACHINE COMPANY, OF SAME PLACE.

FRICTION-CLUTCH.

SPECIFICATION forming part of Letters Patent No. 499,208, dated June 13, 1893.

Application filed July 6, 1891. Serial No. 398,627. (No model.)

*To all whom it may concern:*

Be it known that I, JOHN F. BYERS, a citizen of the United States, residing at Ravenna, Portage county, Ohio, have invented a new and useful Improvement in Friction-Clutches, of which the following is a specification.

Figure 1:
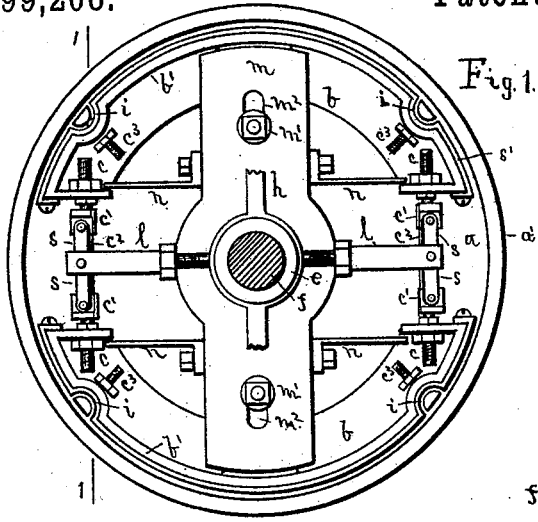
Figure 3:
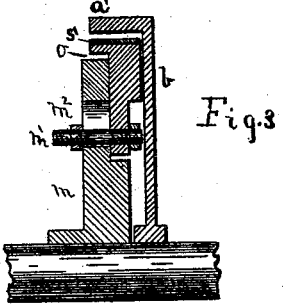
Figure 2:
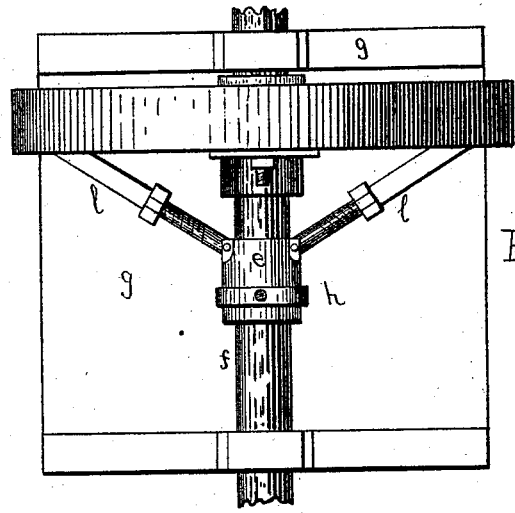
Figure 4:
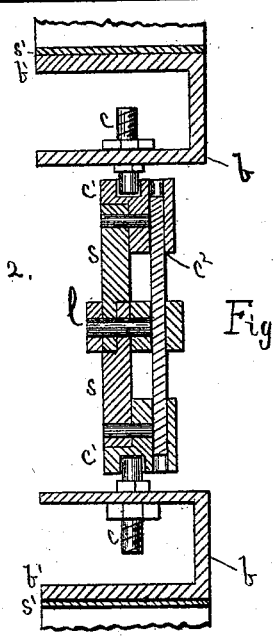

In the drawings hereto annexed and forming a part hereof, Figure 1 is a front elevation of the clutch. Fig. 2 is a plan of the same. Fig. 3 is a cross section of a part of the same; and Fig. 4 is a cross section of the same at line 1 in Fig. 1.

The wheel $a$ is formed with a projecting rim $a'$ within which are situated two segments $b$ $b$ opposite each other, and operate as a clutch by being pressed against the inner surface of rim $a'$. Said pressure is accomplished by means of screw pins $cc$, connected by sliding bars $c'$, guides $c^2$, links or struts $s$, links $l$ with sliding collar $e$ on shaft $f$, and operated by lever $h$ pivoted to frame $g$ in the ordinary manner for the purpose of sliding the collar on the shaft. Screw pins $c$ are adjustable in segments $b$ and their inner ends rest in sockets in bars $c'$. The bars are caused to slide in guides $c^2$ by the movements of struts $s$ which are pivoted to the bars and to link $l$. Link $l$ is preferably formed in two parts connected by screw threads, as shown, to render it adjustable in length and it is pivoted at one end to struts $s$ $s$ and at the other end to collar $e$.

The outer surface of each segment $b$ is formed or provided with a leather covering $s'$ attached to the segments at its ends and firmly drawn or tightened against the segment by being pressed by screws $c^3$ into recesses $i$ in the segment. Any suitable flexible material may be used for the covering. The driving bar $m$ on shaft $f$ retains the segment in position laterally by bolt $m'$ in slot $m^2$. The segment is grooved (as shown at $v$ in Fig. 3) to receive bar $m$ and allow the segment to slide radially and enable the bar to drive the segment. Springs $n$ attached to bar $m$ retain the segments in position with their pins $c$ in sliding bars $c'$. The rim $b'$ of the segment by contact with the end of bar $m$ prevents the segments from contact with rim $a'$ when the clutch is not driving wheel $a$. When connecting struts $s$ are in line with each other or at right angles to links $l$, the segments clutch the wheel rim; and when collar $e$ is moved back from the wheel, links $l$ and struts $s$ draw bars $c'$ toward each other and allow springs $n$ to withdraw the segments from the wheel rim.

I claim as my invention—

In a friction clutch, the combination of wheel $a$ formed with rim $a'$, segments $b$ $b$, pins $c$, bars $c'$ guides $c^2$ struts $s$, links $l$ collar $e$, shaft $f$ and the frame.

JOHN F. BYERS.

Witnesses:
H. B. DICKINSON,
BRADFORD HOWLAND.